(12) United States Patent
Kohlgrüber et al.

(10) Patent No.: US 7,138,478 B2
(45) Date of Patent: Nov. 21, 2006

(54) PROCESS FOR MIXING POLYMER MELTS WITH ADDITIVES

(75) Inventors: Klemens Kohlgrüber, Kürten (DE); Günther Holdenried, Leichlingen (DE); Christian Kords, Krefeld (DE); Jürgen Heuser, Krefeld (DE); Thomas König, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/825,887

(22) Filed: Apr. 16, 2004

(65) Prior Publication Data

US 2004/0225103 A1  Nov. 11, 2004

(30) Foreign Application Priority Data

Apr. 22, 2003 (DE) ................ 103 18 108

(51) Int. Cl.
*C08G 64/00* (2006.01)

(52) U.S. Cl. .............. 528/196; 422/131; 422/135; 528/198; 528/370; 528/480

(58) Field of Classification Search ............. 422/131, 422/135; 528/370, 480, 196, 198
See application file for complete search history.

(56) References Cited

U.S. PATENT DOCUMENTS 4,093,188 A * 6/1978 Horner .................. 366/336
5,376,702 A 12/1994 Stibal et al. ............. 523/313
5,458,478 A 10/1995 Stibal et al. ............. 425/382.3
5,973,101 A 10/1999 Toshida et al. ........... 528/196
6,313,200 B1 11/2001 Finder .................. 523/343
6,344,507 B1 * 2/2002 Wylin .................. 524/312
6,469,072 B1 10/2002 Bhatia et al. ............ 523/206
2002/0035234 A1 * 3/2002 Silva et al. .............. 528/198
2003/0183979 A1 10/2003 Guntherberg et al. .. 264/211.21
2004/0220320 A1 * 11/2004 Adhari et al. ............ 524/487

FOREIGN PATENT DOCUMENTS

DE  199 47 630  4/2001

OTHER PUBLICATIONS

Pahl M.H.; Muschelknautz E.: "Statische Mischer und ihre Anwendung" Chemie Ingenieur Technik, Bd. 52, Nr. 4, 1980, Seiten 285-291, XP002286463.
Chemische Industrie, 37(7), (month unavailable) 1985, p. 474-476, F.A. Streiff, G. Schneider, "Neue Mischverfahren mit geringem Engergiebedarf für Polymerherstellung und -aufbereitung".

* cited by examiner

*Primary Examiner*—Terressa Boykin
(74) *Attorney, Agent, or Firm*—Joseph C. Gil; Aron Preis

(57) ABSTRACT

A continuous process for mixing polymer melts with additives, in particular polycarbonate melts with additives in liquid form, in solution or in dispersion is described. The additives are added to a main stream of polymer melt and are then mixed, preferably directly, with the main stream in a static mixer.

8 Claims, 1 Drawing Sheet

PROCESS FOR MIXING POLYMER MELTS WITH ADDITIVES

FIELD OF THE INVENTION

Figure 1:
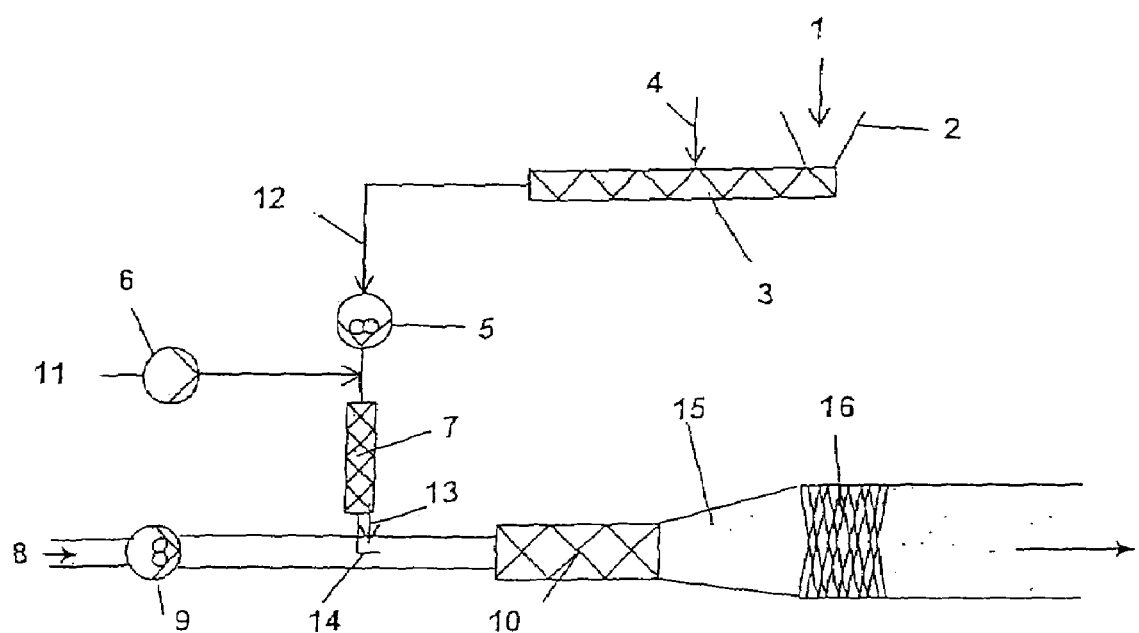

The present invention relates to thermoplastic molding compositions and more particularly to a process for mixing polymer melts with additives.

SUMMARY OF THE INVENTION

A continuous process for mixing polymer melts with additives, in particular polycarbonate melts with additives in liquid form, in solution or in dispersion is described. The additives are added to a main stream of polymer melt and are then mixed, preferably directly, with the main stream in a static mixer.

TECHNICAL BACKGROUND OF THE INVENTION

Additives may as is known undergo undesirable reactions at high temperature, both with the polymer matrix or other additives as well as without further reactants. Due to such reactions the amount of metered additives is on the one hand reduced, which curtails their action. On the other hand secondary products of the reactions may have a deleterious effect on the quality of the polymer, for example by impairing the color. In this connection, a long residence time at high temperature is above all harmful.

For thermoplastic molding compositions there are as is known numerous specifications with which the person skilled in the art in this field is familiar. These may include for example the number average or weight average of the molecular weight, chemical composition, degree or order of branching, contents of volatile or extractable substances, degree of crosslinking of elastomeric phases, viscosities at various shear rates, melt flow index, contents of additives, contents of terminal groups of molecules, content of nonmeltable and/or colored particles, odour, color, or the shape of the product after manufacture and processing. The reasons why these specifications may be difficult to meet are just as multifarious.

These may involve for example fluctuations in the quality of the starting products or a wide range of factors interfering in the process. A further reason for products that do not meet the specifications may lie in start-up procedures or in the need to depart from the specification if throughputs or types of products are changed. These products that do not comply with the relevant specifications are referred to here as secondary products. Secondary products (e.g. recycled products like recycled polycarbonate) can be marketed only at lower prices or have to be disposed of, which leads to high costs and environmental stress due to unnecessary consumption of resources. For this reason it is desirable to find a process by means of which these secondary products may be economically recovered.

The mixing of additives with various polymers by means of mixers without moving parts (static mixers) is in principle known. The use of static mixers for such purposes corresponding to the prior art is described in "Chemische Industrie", 37(7), pp. 474–476, where polystyrene, HIPS and LLDPE are mentioned. The SMX type mixers shown there in FIG. 2 correspond to the current state of the art and are commonly used on an industrial scale. FIG. 1 of said reference shows two process variants, which are characterized hereinafter as 2.1 and 2.2:

2.1. The additives are metered in liquid form in the main stream in front of a static mixer. The disadvantage of this process is that it requires a very long static mixer in the main stream in order reliably to prevent the penetration of droplets, which in turn produces a high pressure loss and requires a long residence time. The long residence time is unfavorable since during this time undesirable secondary reactions of the additive components, of the additive components with one another or with the main stream may occur.

2.2. Pigments and solid additives are conveyed through an extruder in front of the static mixer.

This literature reference also discloses that a low viscosity additive is mixed in a bypass mixer with a side stream comprising ca. 10% of the overall stream.

DE 40 39 857 A1 describes a further process for the mixing of additives in a polymer stream, polyamide and polyester melts being preferred. In this case a side stream is withdrawn from a main stream, the additives are mixed with the side stream with the aid of an extruder fed with melt, and are mixed again with the main stream using a static mixer. The disadvantage of this process is the unavoidable rise in temperature of part of the main stream in the extruder, which on the one hand can impair the quality of the polymer and, in turn, allow undesirable secondary reactions of the additive components, of the additive components with one another or with the polymer of the secondary stream or main stream. A recovery of secondary products is not described in this specification.

DE 198 41 376 A1 describes a further process for the mixing of additives in polymers, in which the examples involve polyesters and copolyesters. Here too a side stream is withdrawn from the main stream, and more specifically by means of a planetary gear pump. The additives are mixed via a static mixer with the side stream and the side stream is afterward in turn mixed via a static mixer with the main stream. In this process it is not possible to incorporate secondary products into the main stream. Also, the temperature is the same as that of the main stream, which means that harmful reactions of the additives may occur at this temperature.

In EP 0 905 184 A2 it is stated that extruders, Banbury mixers, roller mills or kneaders may be used for mixing additives into polycarbonate in the melt. All these devices have the disadvantage that they can damage the polymer and the additives due to input of energy and the associated rise in temperature. The handling of thermoplastic polycarbonate in a roller mill might well be suitable only for laboratory use.

The prior art furthermore includes the following applications and publications:

DE 199 47 630 A1 describes a process for the continuous production of a thermoplastic polymer blend and its use. In this process a stream is directly withdrawn from the primary production and is mixed in a mixer with a side stream of another polymer, which may contain additives.

DE 100 50 023 A1 describes a mixing device and a process for the production of thermoplastic molding compositions, in particular additive batches, using twin-screw machines.

In "Plastverarbeiter", 11(43), 1992, "Statisches Mischen in der Kunststoffverarbeitung und -herstellung" an overview is given of the mixing operations that are carried out with static mixers. This article specifically discusses the various possible uses of an SMX type static mixer, which includes inter alia the mixing of low viscosity additives in polymer melts. The only product example that is mentioned there is the mixing of mineral oil into polystyrene.

The object of the present invention was to provide a process for mixing a main stream of polycarbonate with additives that obviates the disadvantages of the prior art and that minimizes the temperature stress of the additives and permits the use of secondary products.

The invention provides a continuous process for the mixing of polycarbonate melts with additives in liquid form, in solution or in dispersion, in particular in a process for the production of polycarbonate molding compositions, characterized in that the additives are added to a main stream of polymer melt and are then mixed, in particular directly, in a static mixer with the main stream.

A process is preferred that is characterized in that the temperature of the main stream before the mixing is less than 320° C., preferably less than 310° C. and particularly preferably less than 300° C.

The residence time of the main stream in the static mixer is preferably 20 to 120 seconds, particularly preferably 30 to 60 seconds.

A process is also preferred that is characterized in that the additives are fed to the main stream in the form of a side stream consisting of a premixture of polycarbonate melt and additive.

The weight ratio of the side stream to main stream is preferably 1:4 to 1:30, particularly preferably 1:5 to 1:20.

Also preferred is a process that is characterized in that the side stream is formed from molten polycarbonate granules and/or fractured polycarbonate product, in particular from polycarbonate recycling material.

Likewise, a process is preferred that is characterized in that part of the additives or all additives are fed after the melting of the polycarbonate for the side stream and are mixed in using a further static mixer to form the side stream.

The residence time in the further static mixer for the side stream is preferably 10 to 300 seconds, particularly preferably 20 to 120 seconds and most particularly preferably 30 to 60 seconds.

The invention also provides a continuous process for the mixing of high viscosity polymer melts as main stream in a flow tube or flow pipe with additives from a liquid side stream, characterized in that the additives are premixed with a part (portion) of the polymer melt in the side stream, the additive-containing side stream is fed via a line (feed line), in particular arranged centrally in the flow tube, into the main stream, the combined streams are intensively mixed in a first static mixer (10, FIG. 1) directly connected downstream (i.e. the side stream enters the main static mixer just before the main static mixer), and this premixture is finely divided in a mixing tube of enlarged cross-section and in a second static mixer (16, FIG. 1) of finer structure (smaller mesh width). "Smaller mesh width" means that there are more product throughput openings per unit of surface area.

Suitable polymers include all thermoplastic polymers, preferably polystyrene, copolymers of styrene with acrylic acid, methacrylic acid, α-methylstyrene, acrylic acid esters such as methyl methacrylate, butyl acrylate, etc., and especially acrylonitrile (SAN). These polymers may be modified with a rubber phase, for example polybutadiene, polyisoprene, polychloroprene, EPDM, polybutyl acrylate, etc., i.e. rubber modified copolymers such as polybutadiene or polybutylacrylate grafted with the a.m. copolymers like ABS.

In a preferred process the cross-section of the mixing tube of the second static mixer (16, FIG. 1) is by a factor of at least 1.2, preferably by a factor of at least 2 and particularly preferably by a factor of at least 3 larger than the cross-section of the first static mixer (10, FIG. 1).

A process is also preferred in which the number of product throughput openings (per unit of surface area) in the second static mixer is at least 1.5 times the number of product throughput openings (per unit of surface area) in the first static mixer.

Product throughput openings include all bores and openings in the static mixer through which, seen in cross-section through the mixer and pipeline, flows product.

Also preferred is a process that is characterized in that the mixture is finely mixed in a third static mixer, with or without enlarged cross-section, arranged downstream of the second static mixer.

The process is particularly suitable for polymer mixtures in which the mixture has a viscosity in the range from 1 Paxs to $10^7$ Paxs.

The invention furthermore provides thermoplastic molding compositions of polycarbonate produced according to one of the aforementioned processes. Additives may impart multifarious properties to the polymer. These additives may for example include antioxidants, UV absorbers and light stabilizers, metal deactivators, peroxide traps, basic co-stabilizers, nucleating agents, benzofurans and indolinones acting as stabilizers or antioxidants, mold release agents, flame-inhibiting additives, antistatics, colorants and melt stabilizers.

Particularly suitable additives for the implementation of the process are described for example in Additives for Plastics Handbook, John Murphy, 1999, or Plastics Additives Handbook, Hans Zweifel, 2001.

1.1. Preferred suitable antioxidants for the implementation of the process are for example:

1.1.1. Alkylated monophenols, for example 2,6-di-tert.-butyl-4-methylphenol, 2-tert.-butyl-4,6-dimethylphenol, 2,6-di-tert.-butyl-4-ethylphenol, 2,6-di-tert.-butyl-4-n-butylphenol, 2,6-di-tert.-butyl-4-isobutylphenol, 2,6-dicyclopentyl-4-methylphenol, 2-(α-methylcyclohexyl)-4,6-dimethylphenol, 2,6-diocta-decyl-4-methylphenol, 2,4,6-tricyclohexyl-phenol, 2,6-di-tert.-butyl-4-methoxymethylphenol, nonylphenols that are linear or branched in the side chain, for example 2,6-di-nonyl-4-methylphenol, 2,4-dimethyl-6-(1'-methylundec-1'-yl)phenol, 2,4-dimethyl-6-(1'-methyl-heptadec-1'-yl)phenol, 2,4-dimethyl-6-(1'-methyl-tridec-1'-yl)phenol.

1.1.2. Alkylthiomethylphenols, for example 2,4-dioctyithiomethyl-6-tert.-butylphenol, 2,4-dioctylthiomethyl-6-methylphenol, 2,4-dioctylthio-methyl-6-ethylphenol, 2,6-didodecylthiomethyl-4-nonylphenol.

1.1.3. Hydroquinones and alkylated hydroquinones, for example 2,6-di-tert.-butyl-4-methoxyphenol, 2,5-di-tert.-butylhydroquinone, 2,5-di-tert.-amylhydroquinone, 2,6-diphenyl-4-octadecyloxyphenol, 2,6-di-tert.-butylhydroquinone, 2,5-di-tert.-butyl-4-hydroxyanisole, 3,5-di-tert.-butyl-4-hydroxyanisole, 3,5-di-tert.-butyl-4-hydroxyphenyl stearate, bis(3,5-di-tert.-butyl-4-hydroxyphenyl)adipate.

1.1.4. Tocopherols, for example α-tocopherol, β-tocopherol, γ-tocopherol, δ-tocopherol and mixtures thereof (Vitamin E).

1.1.5. Hydroxylated thiodiphenyl ethers, for example 2,2'-thiobis(6-tert.-butyl-4-methylphenol), 2,2'-thiobis(4-octylphenol), 4,4'-thiobis(6-tert.-butyl-3-methylphenol), 4,4'-thiobis(6-tert.-butyl-2-methylphenol), 4,4'-thiobis(3,6-di-sec.-amylphenol), 4,4'-bis(2,6-dimethyl-4-hydroxyphenyl)disulfide.

1.1.6. Alkylidene bisphenols, for example 2,2'-methylenebis (6-tert.-butyl-4-methylphenol), 2,2'-methylenebis(6-tert.-butyl-4-ethylphenol), 2,2'-methylenebis-[4-methyl-6-(α- methylcyclohexyl)phenol], 2,2'-methylenebis-(4-methyl-6-cyclohexylphenol), 2,2'-methylenebis(6-nonyl-4-methylphenol), 2,2'-methylenebis(4,6-di-tert.-butylphenol), 2,2'-ethylidenebis(4,6-di-tert.-butylphenol), 2,2'-ethylidenebis(6-tert.-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert.-butyl-phenol), 4,4'-methylenebis(6-tert.-butyl-2-methylphenol), 1,1-bis(5-tert.-butyl-4-hydroxy-2-methylphenyl)butane, 2,6-bis(3-tert.-butyl-5-methyl-2-hydroxybenzyl)-4-methylphenol, 1,1,3-tris(5-tert.-butyl-4-hydroxy-2-methylphenyl)butane, 1,1-bis (5-tert.-butyl-4-hydroxy-2-methylphenyl)-3-n-dodecylmercaptobutane, ethylenegly-colbis[3,3-bis(3'-tert.-butyl-4'-hydroxyphenyl)butyrate], bis(3-tert.-butyl-4-hydroxy-5-methylphenyl)di-cyclopentadiene, bis[2-(3'-tert.-butyl-2'-hydroxy-5'-methylbenzyl)-6-tert.-butyl-4-methylphenyl]terephthalate, 1,1-bis(3,5-dimethyl-2-hydroxyphenyl)-butane, 2,2-bis(3,5-di-tert.-butyl-4-hydroxyphenyl)propane, 2,2-bis(5-tert.-butyl-4-hydroxy-2-methylphenyl)-4-n-dodecylmercaptobutane, 1,1,5,5-tetra-(5-tert.-butyl-4-hydroxy-2-methylphenyl)pentane.

1.1.7. O-, N- and S-benzyl compounds, for example 3,5,3',5'-tetra-tert.-butyl-4,4'-dihydroxydibenzyl ether, octadecyl-4-hydroxy-3,5-dimethylbenzyl mercaptoacetate, tridecyl-4-hydroxy-3,5-di-tert.-butylbenzyl mercaptoacetate, tris-(3,5-di-tert.-butyl-4-hydroxybenzyl)amine, bis (4-tert.-butyl-3-hydroxy-2,6-dimethylbenzyl)dithioterephthalate, bis(3,5-di-tert.-butyl-4-hydroxybenzyl)-sulfide, isooctyl-3,5-di-tert.-butyl-4-hydroxybenzyl mercaptoacetate.

1.1.8. Hydroxybenzylated malonates, for example dioctadecyl-2,2-bis(3,5-di-tert.-butyl-2-hydroxybenzyl)malonate, dioctadecyl-2-(3-tert.-butyl-4-hydroxy-5-methylbenzyl)malonate, didodecylmercaptoethyl-2,2-bis(3,5-di-tert.-butyl-4-hydroxybenzyl)malonate, bis[4-(1,1,3,3-tetramethylbutyl)phenyl]-2,2-bis-(3,5-di-tert.-butyl-4-hydroxybenzyl)malonate.

1.1.9. Aromatic hydroxybenzyl compounds, for example 1,3,5-tris-(3,5-di-tert.-butyl-4-hydroxybenzyl)-2,4,6-trimethylbenzene, 1,4-bis(3,5-di-tert.-butyl-4-hydroxybenzyl)-2,3,5,6-tetramethylbenzene, 2,4,6-tris(3,5-di-tert.-butyl-4-hydroxybenzyl)phenol.

1.1.10. Triazine compounds, for example 2,4-bis(octylmercapto)-6-(3,5-di-tert.-butyl-4-hydroxyanilino)-1,3,5-triazine, 2-octylmercapto-4,6-bis(3,5-di-tert.-butyl-4-hydroxyanilino)-1,3,5-triazine, 2-octylmercapto-4,6-bis(3,5-di-tert.-butyl-4-hydroxyphenoxy)-1,3,5 triazine, 2,4,6-tris(3,5-di-tert.-butyl-4-hydroxyphenoxy)-1,2,3-triazine, 1,3,5-tris-(3,5-di-tert.-butyl-4-hydroxy-benzyl)isocyanurate, 1,3,5-tris(4-tert.-butyl-3-hydroxy-2,6-dimethylbenzyl)-isocyanurate, 2,4,6-tris(3,5-di-tert.-butyl-4-hydroxyphenylethyl)-1,3,5-triazine, 1,3,5-tris(3,5-di-tert.-butyl-4-hydroxyphenylpropioyl)hexahydro-1,3,5-triazine, 1,3,5-tris(3,5-dicyclohexyl-4-hydroxybenzyl)isocyanurate.

1.1.11. Acylaminophenols, for example 4-hydroxylauranilide, 4-hydroxystearanilide, octyl-N-(3,5-di-tert.-butyl-4-hydroxyphenyl)carbamate.

1.1.12. Esters of β-(3,5-di-tert.-butyl-4-hydroxyphenyl)propionic acid with monohydric or polyhydric alcohols, for example with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.1.13. Esters of β-(5-tert.-butyl-4-hydroxy-3-methylphenyl)propionic acid with monohydric or polyhydric alcohols, for example with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.1.14. Esters of β-(3,5-dicyclohexyl-4-hydroxyphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.1.15. Esters of 3,5-di-tert.-butyl-4-hydroxyphenylacetic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.1.16. Amides of β-(3,5-di-tert.-butyl-4-hydroxyphenyl) propionic acid, for example N,N'-bis(3,5-di-tert.-butyl-4-hydroxyphenylpropionyl)hexamethylene-diamide, N,N'-bis-(3,5-di-tert.-butyl-4-hydroxyphenylpropionyl)trimethylenediamide, N,N'-bis(3,5-di-tert.-butyl-4-hydroxyphenyl-propionyl)-hydrazide, N,N'-bis[2-(3-[3,5-di-tert.-butyl-4-hydroxyphenyl]-propionyl-oxy)ethyl] oxamide (Naugard® XL-1 from Uniroyal).

1.1.17. Ascorbic acid (Vitamin C).

1.1.18. Amine antioxidants, for example N,N'-diisopropyl-p-phenylenediamine, N,N'-di-sec.-butyl-p-phenylenediamine, N,N'-bis(1,4'-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylene-diamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylene-diamine, 4-(p-toluenesulfamoyl)diphenylamine, N,N'-dimethyl-N,N'-di-sec.-butyl-p-phenylenediamine, diphenylamine, N-allyldiphenylamine, 4-isopropoxydiphenylamine, N-phenyl-1-naphthylamine, N-(4-tert.-octylphenyl)-1-naphthylamine, N-phenyl-2-naphthylamine, octylated diphenylamine, for example p,p'-di-tert.-octyl-diphenylamine, 4-n-butylaminophenol, 4-butyrylaminophenol, 4-nonanoylaminophenol, 4-dodecanoylaminophenol, 4-octadecanoylaminophenol, bis(4-methoxy-phenyl)amine, 2,6-di-tert.-butyl-4-dimethyl-aminomethylphenol, 2,4'-diaminodiphenylmethane, 4,4'-diaminodiphenylmethane, N,N,N',N'-tetramethyl-4,4'-diaminodiphenylmethane, 1,2-bis [(2-methylphenyl)amino]-ethane 1,2-bis (phenylamino)propane, (o-tolyl)biguanide, bis[4-(1',3'-dimethylbutyl)phenyl]amine, tert.-octylated N-phenyl-1-naphthylamine, a mixture of monoalkylated and dialkylated tert.-butyl/tert.-octyldiphenyl-amines, a mixture of monoalkylated and dialkylated nonyldiphenylamines, a mixture of monoalkylated and dialkylated dodecyldiphenylamines, a mixture of monoalkylated and dialkylated isopropyl/isohexyldiphenylamines, a mixture of monoalkylated and dialkylated tert.-butyldiphenylamines, 2,3-dihydro-3,3-dimethyl-4H-1,4-benzothiazine, phenothiazine, a mixture of monoalkylated and dialkylated tert.-butyl/tert.-octylphenothiazines, a mixture of monoalkylated and dialkylated tert.-octylphenothiazines, N-allylphenothiazine, N,N,N',N'-tetraphenyl-1,4-diaminobut-2-ene, N,N-bis(2,2,6,6-tetramethylpiperid-4-ylhexamethylene-diamine, bis(2,2,6,6-tetramethylpiperid-4-yl) sebacate, 2,2,6,6-tetramethyl-piperidin-4-one, 2,2,6,6-tetramethylpiperidin-4-ol. Individual examples of these compounds or mixtures thereof may be used.

1.1.19. Preferred suitable thiosynergists for the execution of the process include for example dilauryl thiodipropionate and/or distearyl thiodipropionate.

1.1.20. Secondary antioxidants, phosphites and phosphonites include for example tris-(nonylphenyl)phosphite, tris(2,4-di-tert.-butylphenyl)phosphite, 3,9-bis(2,4-di.-tert.-butylphenoxy)-2,4,8,10-tetraoxa-3,9-diphosphaspiro [5.5]-undecane, 3,9-bis(2,6-di-tert.-butyl-4-methylphenoxy)-2,4,8,10-tetraoxa-3,9-diphosphaspiro(5.5) undecane, 2,2'-methylenebis(4,6-di-tert.-butylphenyl) octyl phosphite, tetrakis(2,4-di-tert.-butylphenyl)-[1,1-biphenyl]-4,4'-diylbis-phosphonite, 2,2'-ethylidenebis(4,6-di-tert.-butylphenyl) fluorophosphite, o,o'-dioctadecyl-pentaerythritol-bis(phosphite), tris[2-[[2,4,8,10-tetra-tert.-butyldibenzo[d,f][1,3,2]dioxa-phosphepin-6-yl]oxy] ethyl]amine, bis(2,4-di-tert.-butyl-6-methylphenyl) ethyl phosphite, 2-butyl-2-ethyl-1,3-propanediyl 2,4,6-tri-tert.-butylphenyl-phosphite, pentaerythritol-bis-((2,4-di-cumyl-phenyl)-phosphite), 2-4-6-tri-tert.-butylphenyl-2-butyl-2-ethyl-1,3-propane-diol phosphite.

1.2. UV absorbers and light stabilisers may be used in the process according to the invention in an amount of 0.01 to 15 wt. %, preferably 0.03 to 8 wt. %, referred to the weight of the composition. Particularly suitable UV absorbers and light stabilizers for the implementation of the process include for example:

1.2.1. 2-(2'-hydroxyphenyl)benzotriazoles, for example 2-(2'-hydroxy-5'-methylphenyl)benzotriazole, 2-(3',5'-di-tert.-butyl-2'-hydroxyphenyl)benzo-triazole, 2-(5'-tert.-butyl-2'-hydroxyphenyl)benzo-triazole, 2-(2'-hydroxy-5'-(1,1,3,3-tetramethylbutyl)phenyl)benzotriazole, 2-(3',5'-di-tert.-butyl-2'-hydroxyphenyl)-5-chlorobenzotriazole, 2-(3'-tert.-butyl-2'-hydroxy-5'-methylphenyl)-5-chlorobenzotriazole, 2-(3'-sec.-butyl-5'-tert.-butyl-2'-hydroxyphenyl)benzotriazole, 2-(2'-hydroxy-4'-octyloxyphenyl)-benzotriazole, 2-(3',5'-di-tert.-amyl-2'-hydroxyphenyl)benzotriazole, 2-(3',5'-bis(α,α-dimethylbenzyl)-2'-hydroxyphenyl)benzotriazole, 2-(3'-tert.-butyl-2'-hydroxy-5'-(2-octyloxycarbonylethyl) phenyl)-5-chlorobenzo-triazole, 2-(3'-tert.-butyl-5'-[2-(2-ethylhexyloxy)carbonylethyl]-2'-hydroxyphenyl)-5-chlorobenzo-triazole, 2-(3'-tert.-butyl-2'-hydroxy-5'-(2-methoxycarbonyl-ethyl)phenyl)-5-chlorobenzotriazole, 2-(3'-tert.-butyl-2'-hydroxy-5'-(2-methoxycarbony-lethyl) phenyl)benzotriazole, 2-(3'-tert.-butyl-2'-hydroxy-5'-(2-octyloxycarbonylethyl)phenyl)benzotriazole, 2-(3'-tert.-butyl-5'-[2-(2-ethylhexyloxy)carbonylethyl]-2'-hydroxyphenyl)-benzotriazole, 2-(3'-dodecyl-2'-hydroxy-5'-methylphenyl)benzotriazole, 2-(3'-tert.-butyl-2'-hydroxy-5'-(2-isooctyloxycarbonylethyl)-phenylbenzotriazole, 2,2'-methylenebis[4-(1,1,3,3-tetramethylbutyl)-6-benzotriazol-2-yl-phenol]; the transesterification product of 2-[3'-tert.-butyl-5'-(2-methoxycarbony-lethyl)-2'-hydroxyphenyl]-2H-benzotriazole with polyethylene glycol 300; [R—CH$_2$CH$_2$—COO—CH$_2$CH$_2$]$_2$, where R=3'-tert.-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethyl-butyl)-5'-(α,α-dimethylbenzyl)phenyl]-benzotriazole.

1.2.2. 2-hydroxybenzophenones, for example the 4-hydroxy, 4-methoxy-, 4-octyloxy, 4-decyloxy, 4-dodecyloxy, 4-benzyloxy, 4,2',4'-trihydroxy and 2'-hydroxy-4,4'-dimethoxy derivatives.

1.2.3. Esters of substituted and unsubstituted benzoic acids, such as for example 4-tert.-butylphenyl salicylate, phenyl salicylate, octylphenyl salicylate, bibenzoylresorcinol, bis (4-tert.-butylbenzoyl)resorcinol, benzoylresorcinol, 2,4-di-tert.-butylphenyl-3,5-di-tert.-butyl-4-hydroxybenzoate, hexadecyl-3,5-di-tert.-butyl-4-hydroxybenzoate, octadecyl-3,5-di-tert.-butyl-4-hydroxy-benzoate, 2-methyl-4,6-di-tert.-butylphenyl-3,5-di-tert.-butyl-4-hydroxy-benzoate.

1.2.4. Acrylates, for example ethyl-α-cyan-β,β-diphenyl acrylate, isooctyl-α-cyan-β,β-diphenyl acrylate, methyl-α-carbomethoxy cinnamate, methyl-α-cyan-β-methyl-p-methoxy cinnamate, butyl-α-cyan-β-methyl-p-methoxy cinnamate, methyl-α-carbomethoxy-p-methoxy cinnamate and N-(β-carbomethoxy-β-cyanvinyl)-2-methylindoline.

1.2.5. Nickel compounds, for example nickel complexes of 2,2'-thiobis[4-(1,1,3,3-tetramethylbutyl)phenol], such as the 1:1 or 1:2 complexes, with or without additional ligands such as n-butylamine, triethanolamine or N-cyclohexyldiethanolamine, nickeldibutyldithio carbamate, nickel salts of the monoalkyl esters, for example of the methyl or ethyl ester, of 4-hydroxy-3,5-di-tert.-butylbenzylphosphonic acid, nickel complexes of ketoximes, for example of 2-hydroxy-4-methylphenylundecyl ketoxime, nickel complexes of 1-phenyl-4-lauroyl-5-hydroxypyrazole, with or without additional ligands.

1.2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetra-methyl-4-piperidyl)sebacate, bis(1,2,2,6,6-pentamethyl-4-piperidyl), n-butyl-3,5-di-tert.-butyl-4-hydroxybenzyl malonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert.-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butantetracarboxylate, 1,1'-(1,2-ethanediyl) bis(3,3,5,5-tetramethylpiperazinone), 4-benzoyl-2,2,6,6-tetramethyl-piperidine, 4-stearyloxy-2,2,6,6-tetramethylpiperidine, bis(1,2,2,6,6-pentamethylpiperidyl)-2-n-butyl-2-(2-hydroxy-3,5-di-tert.-butylbenzyl)-malonate, 3-n-octyl-7,7,9,9-tetramethyl-1,3,8-triazaspiro[4.5]decane-2,4-dione, bis(1-octyloxy-2,2,6,6-tetramethyl-piperidyl) sebacate, bis(1-octyloxy-2,2,6,6-tetramethylpiperidyl)succinate, linear or cyclic condensates of N,N'-bis(2,2,6,6-tetramethyl-4-piperidyl) hexamethylenediamine and 4-morpholino-2,6-dichloro-1, 3,5-triazine, the condensate of 2-chloro-4,6-bis(4-n-butylamino-2,2,6,6-tetramethylpiperidyl)-1,3,5-triazine and 1,2-bis(3-aminopropyl-amino)ethane, the condensate of 2-chloro-4,6-bis(4-n-butylamino-1,2,2,6,6-pentamethylpiperidyl)-1,3,5-triazine and 1,2-bis(3-aminopropyl-amino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylenediamine and 4-cyclo-hexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecyl succinimide, N-(1,2,2,6,6-penta-methyl-4-piperidyl)-n-dodecyl succinimide, 2-undecyl-7,7,9,9-tetramethyl-1-oxa-3,8-diaza-4-oxospiro[4.5]decane, a reaction product of 7,7,9,9-tetramethyl-2-cycloundecyl-1-oxa-3,8-diaza-4-oxospiro[4.5]decane and epi-chlorohydrin, 1,1-bis(1,2,2,6,6-pentamethyl-4-piperidyloxycarbonyl)-2-(4-methoxyphenyl)ethene, N,N'-bis(formyl)-N,N'-bis(2,2,6,6-tetramethyl-4-piperidyl)hexamethylenediamine, diesters of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, the reaction product of maleic anhydride α-olefin copolymer with 2,2,6,6-tetramethyl-4-aminopiperidine or 1,2,2,6,6-pentamethyl-4-aminopiperidine.

1.2.7. Oxamides, for example 4,4'-dioctyloxy oxanilide, 2,2'-diethoxy oxanilide, 2,2'-dioctyloxy-5,5'-di-tert.-butoxanilide, 2,2'-didodecyloxy-5,5'-di-tert.-butoxanilide, 2-ethoxy-2'-ethyl oxanilide, N,N'-bis(3-dimethylaminopropyl)oxanide, 2-ethoxy-5-tert.-butyl-2'-ethoxanilide and their mixtures with 2-ethoxy-2'-ethyl-5,4'-di-tert.-butoxanilide, mixtures of o- and p-methoxy-disubstituted oxanilides and mixtures of o- and p-ethoxy-disubstituted oxanilides.

1.2.8. 2-(2-hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxy-phenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropy-loxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-(2-hydroxy-4-[3-(2-ethyl-hexyl-1-oxy)-2-hydroxypropyloxy]phenyl)-4,6-bis(2,4-dimethylphenyl)-1,3,5-triazine.

Individual examples of these compounds or mixtures thereof may be used.

1.3. Particularly suitable metal deactivators for the implementation of the process are for example N,N'-diphenyloxamide, N-salicylal-N'-salicyloylhydrazine, N,N'-bis(salicyloyl)hydrazine, N,N'-bis(3,5-di-tert.-butyl-4-hydroxyphenyl-propionyl)hydrazine, 3-salicyloylamino-1,2,4-triazole, bis(benzylidene)-oxalyl dihydrazide, oxanilide, isophthaloyl dihydrazide, sebacoylbisphenyl hydrazide, N,N'-diacetyladipoyl dihydrazide, N,N'-bis(salicyloyl)oxalyl dihydrazide, N,N'-bis(salicyloyl)thiopropionyl dihydrazide. Individual examples of these compounds or mixtures thereof may be used.

1.4. Particularly suitable peroxide traps for the implementation of the process are for example esters of β-thiodipropionic acid, for example the lauryl, stearyl, myristyl or tridecyl ester, mercaptobenzimidazole, or the zinc salt of 2-mercaptobenzimidazole, zinc dibutyldithiocarbamate, dioctadecyl disulfide, pentaerythritoltetrakis-(dodecylmercapto)propionate. Individual examples of these compounds or mixtures thereof may be used.

1.5. Particularly suitable basic co-stabilisers for the implementation of the process are for example melamine, polyvinylpyrrolidone, dicyandiamide, triallyl cyanurate, urea derivates, hydrazine derivates, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate. Individual examples of these compounds or mixtures thereof may be used.

1.6. Particularly suitable nucleating agents for the implementation of the process are for example inorganic substances such as talcum, metal oxides such as titanium dioxide or magnesium oxide, phosphates, carbonates or sulfates, preferably of alkaline earth metals; organic compounds such as monocarboxylic acids or polycarboxylic acids and their salts, for example 4-tert.-butylbenzoic acid, adipic acid, diphenylacetic acid, sodium succinate or sodium benzoate; polymeric compounds such as ionic copolymers (ionomers). Particularly preferred are 1,3:2,4-bis(3'4'-dimethyl-benzylidene)sorbitol, 1,3:2,4-di(paramethyldibenzylidene)sorbitol and 1,3:2,4-di(benzylidene)sorbitol. Individual examples of these compounds or mixtures thereof may be used.

1.7. Particularly suitable other additives for the implementation of the process are for example plasticisers, lubricants, emulsifiers, pigments, viscosity modifiers, catalysts, flow-improving agents, optical brighteners, flameproofing agents, antistatic agents and blowing agents.

1.8. Particularly suitable benzofuranones and indolinones for the implementation of the process are for example those described in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-43 16 611; DE-A-43 16 622; DE-A-43 16 876; EP-A-0 589 839 or EP-A-0 591 102, or 3-[4-(2-acetoxyethoxy)phenyl]-5,7-di-tert.-butyl-benzofuran-2-one, 5,7-di-tert.-butyl-3-[4-(2-stearoyloxyethoxy)phenyl]benzofuran-2-one, 3,3'-bis[5,7-di-tert.-butyl-3-(4-[2-hydroxyethoxy]phenyl)benzofuran-2-one], 5,7-di-tert.-butyl-3-(4-ethoxyphenyl)benzofuran-2-one, 3-(4-acetoxy-3,5-dimethyl-phenyl)-5,7-di-tert.-butylbenzofuran-2-one, 3-(3,5-dimethyl-4-pivaloyloxy-phenyl)-5,7-di-tert.-butylbenzofuran-2-one, 3-(3,4-dimethylphenyl)-5,7-di-tert.-butyl-benzofuran-2-one, 3-(2,3-dimethylphenyl)-5,7-di-tert.-butyl-benzofuran-2-one, lactone antioxidants such as

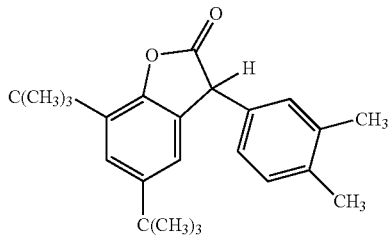

These compounds act for example as antioxidants. Individual examples of these compounds or mixtures thereof may be used.

1.9. Particularly suitable fluorescing plasticisers for the implementation of the process are listed in "Plastics Handbook", Eds. R. Gächter and H. Müller, Hanser Verlag, 3$^{rd}$ Edition, 1990, pp. 775–789.

1.10. Particularly suitable mold release agents for the implementation of the process are esters of aliphatic acids and alcohols, for example pentaerythritol tetrastearate and glycerol monostearate; they are used alone or as a mixture, preferably in an amount of 0.02 to 1 wt. % referred to the mass of the composition.

1.11. Particularly suitable flame-inhibiting additives for the implementation of the process are phosphate esters, i.e. triphenyl phosphate, resorcinol diphosphoric acid ester, bromine-containing compounds such as brominated phosphoric acid esters, brominated oligocarbonates and polycarbonates, as well as salts such as $C_4F_9SO_3^-Na^+$.

1.12. Particularly suitable antistatic agents for the implementation of the process are sulfonate salts, for example tetraethylammonium salts of $C_{12}H_{25}SO^{3-}$ or $C_8F_{17}SO^{3-}$.

1.13. Particularly suitable colorants for the implementation of the process are pigments as well as organic and inorganic dyes.

1.14. Compounds that contain epoxy groups, such as 3,4-epoxycyclohexyl-methyl-3,4-epoxycyclohexyl carboxylate, copolymers of glycidyl methacrylate and epoxysilanes.

1.15. Compounds that contain anhydride groups, such as maleic anhydride, succinic anhydride, benzoic anhydride and phthalic anhydride.

The compounds of the groups 1.14 and 1.15 act as melt stabilisers. They may be used individually or as mixtures.

Thermoplastic, aromatic polycarbonates within the meaning of the present invention include homopolycarbonates as well as copolycarbonates; the polycarbonates may, in a known manner, be linear or branched.

Up to 80 mole %, preferably from 20 mole % up to 50 mole %, of the carbonate groups in the suitable polycarbonates according to the invention may be replaced by aromatic dicarboxylic acid ester groups. Such polycarbonates, which contain acid radicals of carbonic acid as well as acid radicals of aromatic dicarboxylic acids incorporated in the molecular chain, are termed aromatic polyester carbonates. For the sake of simplicity, in the present application they are included under the heading of thermoplastic, aromatic polycarbonates.

The preparation of the polycarbonates to be used in the process according to the invention takes place in a known manner from diphenols, carbonic acid derivatives, optionally chain terminators and optionally branching agents, wherein for the preparation of the polyester carbonates a proportion of the carbonic acid derivatives may be replaced by aromatic dicarboxylic acids or derivatives of dicarboxylic acids, and more specifically according to the proportion of the carbonate structure units to be replaced in the aromatic polycarbonates by aromatic dicarboxylic acid ester structure units.

Details of the production of polycarbonates are available in hundreds of patent specifications published over the last 40 years or so. By way of example reference may be made here simply to Schnell, "Chemistry and Physics of Polycarbonates", Polymer Reviews, Volume 9, Interscience Publishers, New York, London, Sydney 1964;

D. C. Prevorsek, B. T. Debona and Y. Kesten, Corporate Research Center, Allied Chemical Corporation, Morristown, N.J. 07960: "Synthesis of Poly(ester Carbonate) Copolymers" in Journal of Polymer Science, Polymer Chemistry Edition, Vol. 19, 75–90 (1980);

D. Freitag, U. Grigo, P. R. Müller, N. Nouvertne', BAYER AG, "Polycarbonates" in Encyclopedia of Polymer Science and Engineering, Volume 11, Second Edition, 1988, pp. 648–718, and finally Drs U. Grigo, K. Kircher and P. R. Müller "Polycarbonate" in Becker/Braun, Kunststoff-Handbuch, Vol. 3/1, Polycarbonate, Polyacetale, Polyester, Celluloseester, Carl Hanser Verlag, Munich, Vienna 1992, pp. 117–299.

The thermoplastic polycarbonates that are preferably used in the process, including the thermoplastic, aromatic polyester carbonates, have a weight average molecular weight $M_w$ (determined by measurement of the relative viscosity at 25° C. in $CH_2Cl_2$ and at a concentration of 0.5 g per 100 ml $CH_2Cl_2$) of 12,000 to 120,000, preferably 15,000 to 80,000 and in particular 15,000 to 60,000.

Suitable diphenols for the production of the polycarbonates are for example hydroquinone, resorcinol, dihydroxydiphenyl, bis-(hydroxyphenyl)-alkanes, bis(hydroxyphenyl)-cycloalkanes, bis-(hydroxyphenyl)-sulfides, bis (hydroxy-phenyl)-ethers, bis-(hydroxyphenyl)-ketones, bis-(hydroxyphenyl)-sulfones, bis-(hydroxyphenyl)-sulfoxides, (α,α-bis-(hydroxyphenyl)-diisopropylbenzenes, as well as their nuclear-alkylated and nuclear-halogenated compounds.

Preferred diphenols are 4,4'-dihydroxydiphenyl, 2,2-bis-(4-hydroxyphenyl)-1-phenylpro-pane, 1,1-bis(4-hydroxyphenyl)phenylethane, 2,2-bis-(4-hydroxyphenyl)propane, 2,4-bis-(4-hydroxyphenyl)-2-methylbutane, 1,1-bis-(4-hydroxyphenyl)-m/p diisopropylbenzene, 2,2-bis-(3-methylthydroxyphenyl)-propane, bis-(3,5dimethyl-4-hydroxyphenyl)-methane, 2,2-bis-(3,5-dimethyl-4-hydroxyphenyl)-propane, bis-(3,5dimethyl-4-hydroxyphenyl)-sulfone, 2,4-bis-(3,5-dimethyl-4hydroxyphenyl)2-methylbutane, 1,1-bis-(3,5-dimethyl-4-hydroxyphenyl)-m/p-diisopropylbenzene,2,2- and 1,1-bis-(4-hydroxyphenyl)-3,3,5-trimethylcyclohexane.

Particularly preferred diphenols are 4,4'-dihydroxydiphenyl, 1,1-bis-(4-hydroxyphenyl)-phenylethane, 2,2-bis-(4-hydroxyphenyl)-propane, 2,2-bis(3,5-dimethyl-4-hydroxyphenyl)-propane), 1,1-bis-(4-hydroxyphenyl)-cyclohexane, 1,1-bis-(4-hydroxyphenyl)-m/p diisopropylbenzene and 1,1-bis-(4-hydroxy-phenyl)-3,3,5-trimethylcyclohexane.

These and further suitable diphenols are described for example in the patent specifications: U.S. Pat. No. 3,028,635, U.S. Pat. No. 2,999,835, U.S. Pat. No. 3,148,172, U.S. Pat. No. 2,991,273, U.S. Pat. No. 3,271,367, U.S. Pat. No. 4,982,014 and U.S. Pat. No. 2,999,846, in German laid-open specifications DE-A-1 570 703, DE-A-2 063 050, DE-A-2 036 052, DE-A-2 211 956 and DE-A-3 832 396, in French patent specification FR 1 561 518, in the monograph by H. Schnell "Chemistry and Physics of Polycarbonates", Interscience Publishers, New York 1964, as well as in the Japanese laid-open specifications 62039/1986, 62040/1986 and 105550/1986.

In the case of homopolycarbonates only one diphenol is used, while in the case of copolycarbonates several diphenols are used, in which connection obviously the bisphenols that are used, like all other chemicals and auxiliary substances added to the synthesis, may be contaminated with impurities derived from their own synthesis, although it is desirable to work with raw materials that are as pure as possible.

Suitable chain terminators include monophenols as well as monocarboxylic acids. Suitable monophenols include phenol, alkylphenols such as cresols, p-tert.-butylphenol, p-n-octylphenol, p-iso-octylphenol, p-n-nonylphenol and p-iso-nonylphenol, halogenated phenols such as p-chlorophenol, 2,4-dichlorophenol, p-bromophenol and 2,4,6-tribromophenol, and their mixtures.

Suitable monocarboxylic acids include benzoic acid, alkylbenzoic acids and halogenated benzoic acids.

Preferred chain terminators are phenols of the formula (I)

$R^6$-Ph-OH     (I)

wherein $R^6$ denotes H or a branched or unbranched $C_1$–$C_{18}$-alkyl radical.

The amount of chain terminators used is 0.5 mole % to 10 mole % relative to moles of diphenols used in each case. The addition of the chain terminators may take place before, during or after the phosgenation.

Suitable branching agents are the trifunctional or higher than trifunctional compounds known in polycarbonate chemistry, particularly those with three or more phenolic OH groups.

Suitable branching agents are for example phloroglucinol, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxy-phenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)phenyl)-ortho-terephthalic acid ester, tetra-(4-hydroxy-phenyl)-methane, tetra-(4-(4-hydroxyphenyl-isopropyl)-phenoxy)-methane and 1,4-bis(4',4"-dihydroxy-triphenyl)-methyl)-benzene, as well as 2,4-dihydroxybenzoic acid, trimesic acid, cyanuric chloride and 3,3-bis-(3-methyl-4-hydroxyphenyl)-2-oxo-2,3-dihydroindole.

The amount of branching agents optionally used is 0.05 mole % to 2.5 mole % relative to moles of diphenols used in each case.

The branching agents may be added either together with the diphenols and the chain terminators in the aqueous alkaline phase, or may be dissolved in an organic solvent and added before the phosgenation.

All these procedures for the production of the polycarbonates are known to the person skilled in the art.

Suitable aromatic dicarboxylic acids for the production of the polyester carbonates are for example phthalic acid, terephthalic acid, isophthalic acid, tert.-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyletherdicarboxylic acid, 4,4'-diphenylsulfonedicarboxylic acid, 2,2-bis-(4-carboxyphenyl)-propane, trimethyl-3-phenylindane-4,5'-dicarboxylic acid.

Among the aromatic dicarboxylic acids, terephthalic acid and/or isophthalic acid are particularly preferably used.

Derivatives of the dicarboxylic acids include the dicarboxylic acid dihalides and the dicarboxylic acid dialkyl esters, in particular the dicarboxylic acid dichlorides and the dicarboxylic acid dimethyl esters.

The replacement of the carbonate groups by the aromatic dicarboxylic acid ester groups takes place substantially stoichiometrically and also quantitatively, so that the molar ratio of the reactants is also reproduced in the finished polyester carbonate. The incorporation of the aromatic dicarboxylic acid ester groups may take place randomly as well as in a blockwise manner.

Preferred processes for producing the polycarbonates, including the polyester carbonates, to be used according to the invention are the known phase interface process and the known melt transesterification process.

In the first case phosgene is preferably used as carbonic acid derivative, while in the latter case diphenyl carbonate is preferably used. Catalysts, solvents, working-up, reaction conditions, etc., for the production of the polycarbonates are sufficiently described and known in both cases.

The polycarbonate molding compositions according to the invention may be processed into molded articles in conventional processing equipment according to known methods under the processing parameters conventionally used for polycarbonates.

A molten main stream may occur in the primary production of polycarbonate from various processes. The following cases 3.1 and 3.2 should be understood as examples that illustrate the scope of the invention without however restricting it.

3.1. DE 100 05 151 A1 (corresponding to U.S. Pat. No. 6,620,906 that is incorporated herein by reference) describes a multistage process for the production of very pure polycarbonate by the phase interface process. In this process the washed and filtered solution with a polymer fraction of 5 to 20 wt. % is adjusted to a concentration of 60 to 75 wt. % in one or more steps in which in each case there may be used tubular heat exchangers with downstream-connected separators, thin-layer evaporators or spiral coil evaporators with downstream-connected separators or a combination of tubular heat exchangers and spiral coil evaporators with downstream-connected separators, and in which the pressure in the last stage is between 0.1 MPa and 0.4 MPa. In a further stage the solution is fed to a tubular heat exchanger with downstream-connected separator, which at a temperature of 250° to 350° C. concentrates the solution to at least 95 wt. %, in particular to 98 to 99.5 wt. %. In a further stage the solution containing residues of solvent and/or other volatile components is concentrated in a further tubular heat exchanger or an extrusion vapourizer at a temperature of 250° to 350° C. to a solvent content of 5 to 500 ppm. The main stream according to the invention is in this case added to the discharge of the last stage.

3.2 DE 101 198 51 (corresponding to U.S. Pat. No. 6,630,563 that is incorporated herein by reference) describes a process for the continuous production of polycarbonates from oligocarbonates according to the transesterification process with vapourization of monophenols in a reactor, which permits the constant formation of free films at film formation rates greater than 10. The reactor is in this connection designed as an horizontal cylinder in which perforated discs rotate on a hollow shaft. The film formation rate is defined as the ratio of the amount of the material that when pulled off from the rotating disc flows downwardly again in the form of a free film, to the total amount of the throughput of the reactor. The main stream according to the invention is in this case added to the discharge from this reactor.

It was surprisingly found that molten polycarbonate may be mixed with additives at the high temperatures prevailing in the static mixer and at the residence time required in the static mixer, a product thereby being formed that has excellent color and very good properties. The temperatures of the main stream are in this connection below 320° C., preferably below 310° C. and particularly preferably below 300° C. The residence times in this static mixer (hereinafter termed main static mixer) are between 10 and 600 seconds, preferably between 20 and 120 seconds and particularly preferably between 30 and 60 seconds. Additives in solid form or in the form of a premixutre with polymer (so-called master batches) may also be mixed with the granules. In addition it is possible to mix liquid additives in the melting device. In both cases a premixing of the additives with the polymer stream may be carried out in the melting device. The polymer stream that is thereby obtained is mixed in a static mixer (hereinafter termed side static mixer) with further, liquid additives with a residence time between 10 and 300 seconds, preferably between 20 and 180 seconds and particularly preferably between 30 and 120 seconds, and is added to the main stream, with which it is mixed in turn by means of a static mixer. It is particularly convenient as regards the product quality if the temperature of the side stream is below that of the main stream, since in this way the overall residence time of the additives at the high temperature of the main stream is less than in the case of direct metering in front of the main static mixer. It was surprisingly found that under these conditions the quality of the main stream remains within the specifications even when using secondary products. A ratio of side stream to main stream of between 1:4 and 1:30 is preferred, the ratio particularly preferably being between 1:5 and 1:20.

The melting device may be designed according to the prior art by a person skilled in the art and may for example be a single-screw extruder, a co- or counter rotating twin screw extruder, an intermeshing co-rotating twin screw extruder, multi screw extruder rotating in the same direction, or a co-kneader. An intermeshing co-rotating twin screw extruder is preferably used. A unit to increase the pressure, preferably a gear pump, may be employed after the melting device.

The static mixers that are used may likewise be designed according to the prior art by a person skilled in the art. SMX type static mixers may preferably be employed (see U.S. Pat. No. 4,062,524) as well as mixers according to DE 100 31 766 A1 or U.S. Pat. No. 6,394,644 B1.

The invention is described in more detail hereinafter by way of example and with reference to FIG. 1, which shows diagrammatically the process procedure.

EXAMPLES

Example 1

FIG. 1 shows in the form of a process flow diagram an example of the present invention. 300 kg/h of a granular material of polycarbonate 1, with which are mixed 1.4 kg/h of mold release agent in solid form, are fed to the filling funnel 2 of an intermeshing co-rotating twin screw extruder 3. A gear pump 5 increases the pressure of the melt to 98 bar. The temperature of the melt downstream of the gear pump is 275° C. A high-pressure piston pump 6 adds 850 g/h of a liquid thermostabiliser. Additives 11 and melt 12 are premixed with a side stream 13 in a static mixer 7 with a residence time of 120 seconds. A product stream 8 is discharged at a rate of 5.5 tons/hour with a relative viscosity of 1.20 at a temperature of 280° C. by means of a gear pump 9, from a process for the production of polycarbonate by transesterification according to DE-A-10 119 851. The side stream and main stream are mixed together in a static mixer 10 with a residence time of 40 seconds. The product is then granulated. The yellowness index (YI) of the mixture is 1.2 and the transmission is 90%.

Example 2

A flow of 290 kg/hour of secondary product consisting of polycarbonate 1, with which are mixed 60 kg of master batch for two different colorants as well as a thermal stabilizer in solid form, are fed to the filling funnel 2 of an intermeshing co-rotating twin screw extruder 3. The feed line 4 shows a further possible way of metering in liquid additives. A gear pump 5 increases the pressure of the melt to 160 bar. The temperature of the melt downstream of the gear pump is 305° C. A high-pressure piston pump 6 conveys 1.7 kg/hour of a further thermostabilizer in liquid form. Additives 11 and polymer 12 are premixed with the side stream 13 in a static mixer with a residence time of 120 seconds. A product stream 8 of polycarbonate is discharged at a rate of 5.5 tonnes/hour and a relative viscosity of 1.32 at a.temperature of 300° C. using a discharge gear pump 9, from a process for the production of polycarbonate by transesterification according to DE 10 119 851. The side stream and main stream are mixed together in a static mixer 10 at a residence time of 40 seconds. The product is then granulated. The result is a blue-colored polycarbonate with outstanding uniformity of the color mixing and a transmission of 87.1%.

The relative viscosity is given as a quotient of the viscosity of the solvent and the viscosity of the polymer dissolved in this solvent. The viscosities were determined in dichloromethane at a concentration of 5 g/l at 25° C.

The yellowness index YI was determined according to ASTM E 313 on injection-molded samples of 4 mm thickness. The injection molding temperature was 300° C. The transparency was determined on the same sample by measuring the absorption in visible light.

Example 3

A similar procedure to Example 2 was adopted, except that the static mixer 10 was replaced by a combination of a first static mixer 10 comprising a mixer unit of 12 mixer discs according to FIG. 5 of EP-A 947 239 (U.S. published patent application 2001/053108 incorporated herein by reference) with a diameter of ca. 46 mm, and 14 rectangular product throughflows, a downstream mixer tube 15 of cross-section expanded to 175 mm, followed by a static mixer unit 16 of finer mesh width. This mixer unit was designed corresponding to EP-A 947 239 and had 38 10 mm-thick discs each with 48 openings with a diameter 175 mm.

In this way 1 ton of polycarbonate in the main stream could be mixed completely with the additive side stream over a considerably shorter mixing section.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Continuous process for mixing highly viscous polymer melts as main stream in a flow tube with additives from a liquid side stream, characterized in that the additives (11) are premixed with part of the polymer melt (12) in the side stream, that the additive-containing side stream (13) is fed through a feed line (14) arranged in particular centrally in the flow tube, into the main stream (8), the combined streams are intensively mixed in a first static mixer (10) directly connected downstream, and this premixture is finely divided in a mixing tube (15) of enlarged cross-section and in a second static mixer (16) of finer structure (mesh width).

2. Process according to claim 1, characterised in that the cross-section of the mixing tube of the second static mixer is by a factor of at least 1.2 larger than the cross-section of the mixing tube of the first static mixer.

3. Process according to claim 1 characterised in that the cross-section of the mixing tube of the second static mixer is by a factor of at least 2 larger than the cross-section of the mixing tube of the first static mixer.

4. Process according to claim 1 characterised in that the number of the product throughput openings (per unit surface area) in the second static mixer is at least 1.5 times the number of throughput openings (per unit surface area) in the first static mixer.

5. Process according to claim 1 characterised in that the highly viscous polymer melt is polycarbonate.

6. The mixture of thermoplastic polycarbonate and at least one additive prepared by the process of claim 1.

7. The process of claim 1 wherein the side stream is formed from recycled polycarbonate.

8. The process according to claim 1 wherein the weight ratio of the side stream to the main stream is 1:4 to 1:30.

\* \* \* \* \*